M. H. SHOENBERG.
AUTOMATIC CONTROL OF THE CIRCUITS OF ELECTRIC HEATING APPARATUS, ETC.
APPLICATION FILED JULY 8, 1919.

1,405,450.

Patented Feb. 7, 1922.

2 SHEETS—SHEET 1.

Witnesses

Inventor
M. H. Shoenberg

By Eugene C. Brown
Attorney

M. H. SHOENBERG.
AUTOMATIC CONTROL OF THE CIRCUITS OF ELECTRIC HEATING APPARATUS, ETC.
APPLICATION FILED JULY 8, 1919.
1,405,450.
Patented Feb. 7, 1922.
2 SHEETS—SHEET 2.
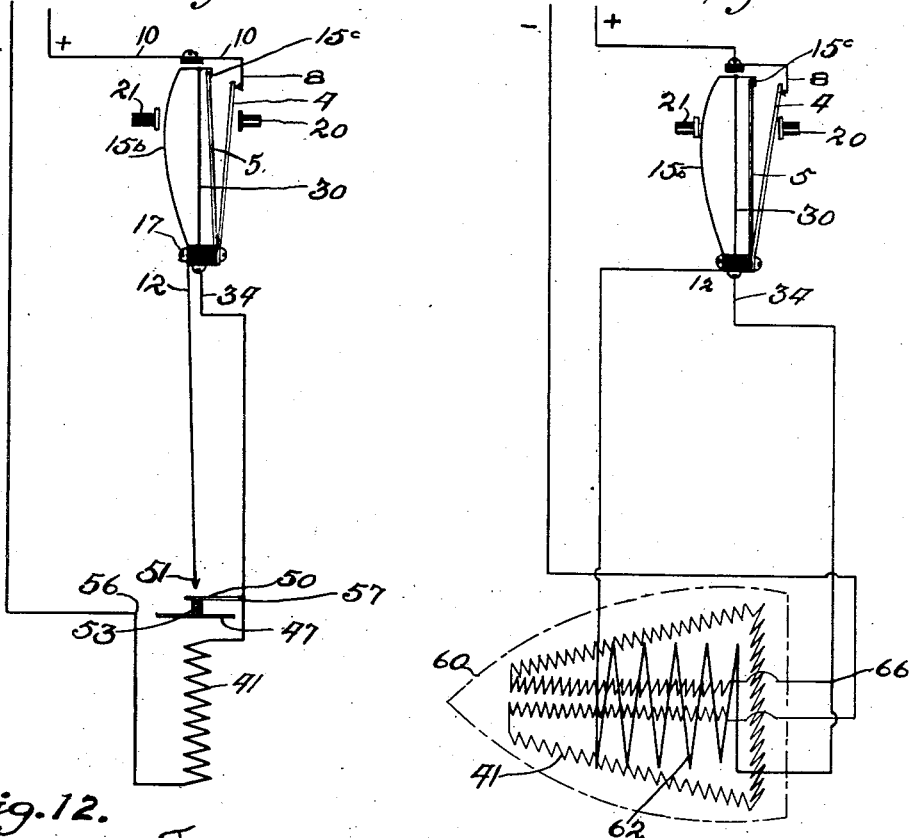
Inventor
M. H. Shoenberg
By Eugene C. Brown
Attorney

UNITED STATES PATENT OFFICE.

MILTON H. SHOENBERG, OF SAN FRANCISCO, CALIFORNIA, ASSIGNOR TO MAJESTIC ELECTRIC DEVELOPMENT COMPANY, A CORPORATION OF CALIFORNIA.

AUTOMATIC CONTROL OF THE CIRCUITS OF ELECTRIC HEATING APPARATUS, ETC.

1,405,450. Specification of Letters Patent. Patented Feb. 7, 1922.

Application filed July 8, 1919. Serial No. 309,433.

*To all whom it may concern:*

Be it known that I, MILTON H. SHOENBERG, a citizen of the United States, residing at San Francisco, in the county of San Francisco and State of California, have invented certain new and useful Improvements in Automatic Control of the Circuits of Electric Heating Apparatus, etc., of which the following is a specification.

This invention relates to the control of electric circuits, and while especially adapted for controlling the circuits of electric heaters, such as water heaters, percolators, sterilizers, electric irons, etc., it may also be used as a thermally controlled overload switch for electric circuits generally.

The main purpose of my invention is to provide a switch which can be manually operated to close and open an electric circuit and which will operate automatically to open the circuit in case of an overload or an undue flow of current, such control being effected by a thermally actuated switch member. A further object of my invention is to provide an auxiliary controlling device cooperating with the thermal switch member to open the circuit, such auxiliary member being separate from the switch and directly affected by the condition of the work being effected.

Figure 5:
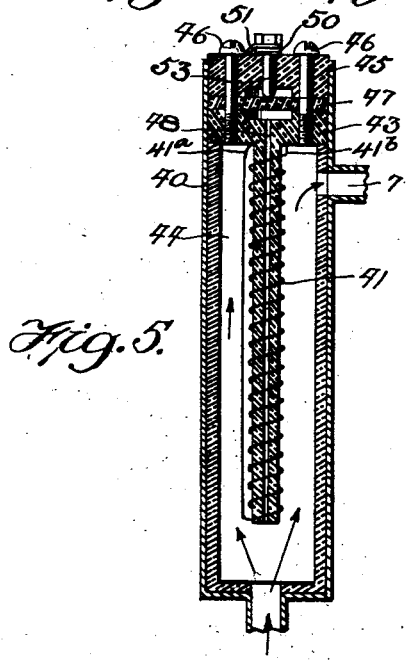
Figure 6:
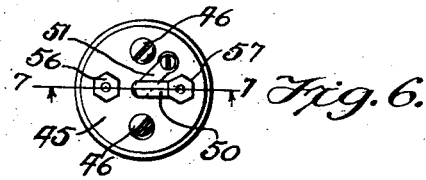
Figure 7:
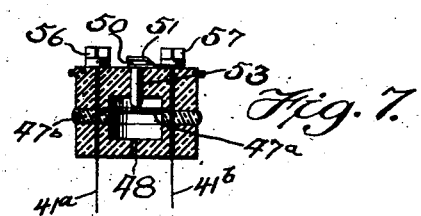
Figure 8:
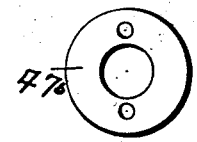

In the accompanying drawings, Figures 1, 2, 3 and 4, are elevations partly in section of a switch embodying my invention and showing the switch in different positions; Fig. 5, is a vertical sectional view of an electric water heater showing one form of auxiliary circuit controlling device, actuated by water pressure, which acts in conjunction with the thermal element in the switch to effect a complete automatic control of the heating circuit; Figs. 6, 7 and 8 are detail views of the parts of the pressure actuated device; Fig. 9 is a diagrammatic illustration of the circuit containing a water heater and embodying my automatic controlling features; Fig. 10 shows my automatic controlling switch applied to the heating circuit of an electric iron; Fig. 11, shows a modification of the latter; and Fig. 12, is a sectional view of a modified form of my automatic switch.

My combined manual and thermally controlled switch may be enclosed in a suitable casing 1 and may be inserted as a small pendant switch in the usual cord-conductors connected to heating devices, such as water heaters connected to faucets, electric irons, percolators, etc. The switch mechanism is carried by a suitable insulating block 3, secured within the casing. The movable contact element comprises a pair of spring arms 4, 5 secured at one end to the insulating block by a plate 6, the free ends normally bearing against the angle plate 8, which constitutes a fixed contact post and is connected to the conductor 10.

Figures 1, 2, 3, 4:
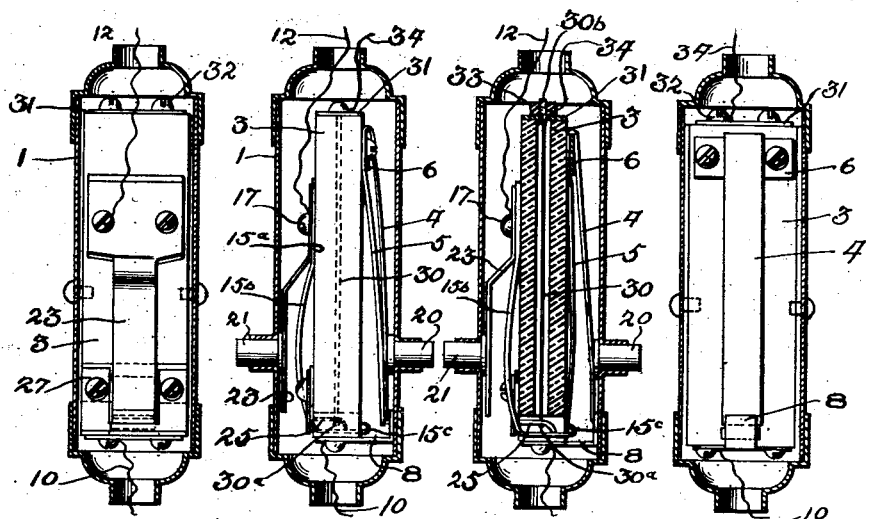

A latch member comprising a spring strip having one end 15ᵃ secured to the block 3 by a screw 17, constituting a binding post to which the conductor terminal 12 is attached, an intermediate bowed portion 15ᵇ and a hooked end 15ᶜ which is carried around the end of the block in a position to be engaged by the free end of the contact strip 5 when it is pressed inward by the thumb button 20. It will be observed that when the spring contact strips 4, 5 are pressed inwardly by the thumb button 20, the inner strip 5 will snap under the latch hook 15ᶜ and be retained while the outer shorter strip 4 will spring back against the angle post 8, as indicated in Fig. 3. To release the contact strip 5, the thumb button 21 is pressed inwardly until the leaf spring 23 presses the bowed portion 15ᵇ of the latch member toward the block 3, thereby flattening it and causing the hook end 15ᶜ to move outwardly and thus releasing the end of the contact strip 5, which springs back into the initial position shown in Fig. 2.

The parts thus far described constitute a manually controlled snap switch for closing and opening an electric circuit. For the purpose of automatically moving the hook 15ᶜ of the latch member outwardly to release the contact strip 5 upon an undue flow of current or an undue heating of the translating device, I provide a spring arm 25, secured at its inner end to the plate 27 which is fastened to the block 3, and having its outer end bent outwardly and bearing against the inner side of the latch member. The spring arm 25 is normally restrained from pushing outwardly against the latch by a thermostatic-wire 30, which is secured at one end to a plate 31, fastened to the upper end of the block, and at the other end passes through an aperture in the arm 25, being provided with an enlarged end 30ᵃ which bears against the lower side of the latch. The thermal wire 30 is connected to the controlling circuit, which is sometimes a shunt circuit, by a conductor 34 attached to the screw 32 constituting a binding post. The switch may be employed as an overload switch by connecting the circuit conductors to the terminal conductors 10 and 34 so that the main current will flow directly through the thermal wire 30. In this case when the switch is in the closed position shown in Fig. 3, the circuit passes from conductor 10, through angle post 8, spring arm 4, spring arm 5, latch hook 15ᶜ, spring arm 25, thermal wire 30 and terminal conductor 34. If there is an undue flow of current the thermal wire 30 is abnormally heated and expands thereby permitting the spring arm 25 to move outwardly and push the latch until the hook 15ᶜ moves outwardly sufficiently to release the spring contact arm 5, thereby breaking the circuit. It will be observed that the switch is at all times also under manual control since the latch may be released instantly by pressure upon the push button 21.

In order that the modified form of switch shown in Fig. 12 may be understood from the foregoing description of the switch parts and their function, I have designated the corresponding parts by the same reference characters. In this form both the circuit closing button 20 and the opening button 21 are placed on the same side and to better accommodate this arrangement the angle post 8 is placed in an intermediate position on the block 3.

In case it is desirable to vary the tension on the thermal wire 30, the fixed end may be attached to a threaded nipple 30ᵇ to receive the adjusting nut 33, as shown in Fig. 3.

My invention comprises also a controlling circuit which includes an auxiliary controlling element cooperating with the thermal element of the switch to effect the breaking of the circuit through the electric heater or other translating device. In Fig. 5, I have shown the auxiliary controlling element in the form of a pressure actuated diaphragm which operates to close a circuit in shunt to the thermal switch element. The water heater illustrated comprises a casing 40, having a cylindrical heating chamber or channel 44 through which the water flows and is heated by the heating element 41. The closure for the upper end of the heating chamber comprises separable insulating plugs 43, 45 which are fastened together by screws 46, and clamp between them a rubber disk 47, the plugs being centrally recessed to provide a space permitting lateral movement of the central portion of the disk. After the closure is inserted in the casing the screws are tightened and cause the periphery of the disk to spread or bulge outwardly as indicated in Fig. 7, thereby forming a watertight joint with the inner wall of the casing, the disk thus constituting a gasket as well as a diaphragm. The diaphragm portion and gasket portion may be made separate as shown in Fig. 7, at 47ᵃ, 47ᵇ. The lower side of the diaphragm is in communication with the water chamber through a small channel 48. Contacts 50, 51 carried by the plug 45 are normally separated and are pressed together by the plunger 53 when the diaphragm is forced upwardly by the water pressure in the chamber 44. The terminals 41ᵃ, 41ᵇ of the heating element pass through the plugs and are soldered or otherwise secured to binding posts 56, 57. The lower spring contact strip 50 is connected to the binding post 57.

In Fig. 9, I have shown diagrammatically the manner in which the water heater is connected in circuit with the switch, the corresponding parts being designated by the same reference characters. The operation will be clear from the previous description of the separate parts. Assuming that the push button 20 has been operated to engage the contact arm 5 under the latch hook 15ᶜ, the current flows from the conductor 10, to angle post 8, arm 4, arm 5, hook 15ᶜ, latch member 15ᵇ, binding post 17 to conductor 12. If the water has been turned on in the water heater, by opening the faucet, the pressure forces the diaphragm 47 upwardly and closes the contacts 50, 51 of the auxiliary control device. The current will therefore flow through contacts 51 and 50, through the heating element 41 and out to the main negative conductor. It will be observed that there is also a circuit from the hook 15ᶜ of the latch member through the thermal wire 30 and conductor leading from the terminal 34 directly to the heating unit 41, but it will be understood that as the resistance of the thermal wire is greater than the other path which shunts it through the contacts 50, 51, very little current will traverse the thermal wire. If, however, the water is shut off so that there is no water pressure in the heater chamber, and the diaphragm is therefore retracted leaving the contacts 50, 51 open, all of the current must traverse the path through the thermal wire 30, causing it to become abnormally heated, whereupon it instantly expands and permits the latch to release the contact arm 5, thereby opening the circuit.

It is apparent, therefore, that the heating coil 41 can never be in danger of burning out because the action of the thermal wire will always trip the latch to open the circuit whenever there is no water pressure in the water heater to act upon the diaphragm.

If it is desired, however, to change from hot to cold water while the water is turned on and constantly flowing through the channel in the water heater, the electric current may be cut off or turned on manually at will by manipulating the push buttons 20 and 21.

The auxiliary control device which cooperates with the thermal switch element to automatically open the main circuit may be in the form of an auxiliary conductor having a high temperature coefficient and which is directly affected by the accumulation of heat in the electric heater or other translating device. I have shown such an auxiliary device in connection with an electrically heated flat iron in Fig. 10. As before stated, I have designated the corresponding parts by the reference characters previously used.

While a flat iron is being moved over the dampened clothes in the process of ironing, heat is being constantly and rapidly abstracted from the iron and this energy is supplied by the electric heating coil or unit within the iron. If, however, the iron is allowed to remain in one place inadvertently or through ignorance or carelessness while the current is on, the heat accumulates and frequently scorches the clothing or ironing board cover and sometimes causes them to ignite. My invention provides an efficient safeguard against such accidents by automatically cutting off the current as soon as the heat in the iron becomes abnormal.

In Fig. 10 the iron is indicated by the outline 60 and the heating unit or coil by 41. Within the enclosed chamber of the iron I place a short length of wire 62, of iron or other suitable material having a high temperature coefficient. This is connected in such a manner that normally the current flows through this length of iron wire in series with the heating coil and in shunt to the thermal element of the switch. As long as the heat is being abstracted from the iron while in use, the auxiliary element 62 will not become abnormally hot. When the iron is allowed to remain in one spot, the heat accumulates until the iron element 62 reaches such a temperature that its increased resistance causes a sufficient amount of current to take the other shunt path through the thermal switch element 30, to automatically trip the latch and open the main circuit.

Normally the current flows from the positive main conductor by way of the angle post 8, contact strip 4, contact strip 5, hook 15ᶜ, latch member 15ᵇ, terminal conductor 12, auxiliary iron wire element 62, to the branching point 66, then through the heating unit 41 of the iron and out to the negative main conductor. It will be observed that there is also a shunt path from the latch hook 15ᶜ through the thermal element 30, and terminal conductor 34 to the branching point 66, but owing to the greater resistance through the thermal element 30, very little current traverses this shunt path. When, however, the iron is allowed to remain in one place so that the heat is not abstracted and accumulates, the increase in heat augments the resistance of the iron wire element 62 and causes current to traverse the shunt path through the thermal element 30, resulting in the movement of the latch to open the circuit.

When it is not convenient to place the auxiliary controlling element 62 within the chamber of the flat iron, it may be embodied in the stand upon which the iron rests when not in use, as illustrated in Fig. 11. The element 62 may be placed between sheets of mica 68 or other suitable insulating material, and secured to the top of the stand or iron-rest 69. The electrical connections are the same as in Fig. 10. In this case the thermal element opens the switch only if the iron is allowed to remain idle by resting on the stand for any appreciable or predetermined period of time.

It will be evident to electrical engineers and others skilled in this art, that my invention is capable of many adaptations and uses which will readily suggest themselves. Thus when used in connection with electrically heated sterilizers or percolators, the auxiliary controlling element 62 may be immersed in the water so that in case the water boils away until the wire is exposed, the resistance of said auxiliary element will immediately increase and cause an increased current to flow through the shunt circuit including the thermal switch element and thereby cause the circuit to automatically open in the manner described.

I claim:—

1. In a system of control for electric heating apparatus, a switch in circuit with the electric heater, comprising manual means for closing and for opening the switch contacts, a thermally controlled latch member for holding the contacts in closed position, a thermo-element controlling said latch member, an auxiliary circuit in shunt to said thermo-element, and means actuated by an abnormal condition of the heating apparatus operating to cause an abnormal current to flow through the thermo element to thereby release the latch member and open the switch contacts.

2. In a system of control for electric heating apparatus, a switch in circuit with the electric heater, comprising manual means for closing and for opening the switch contacts, a thermally controlled latch member for holding the contacts in closed position, a thermo-element controlling said latch member, an auxiliary circuit in shunt to said thermo element, and means in said shunt circuit actuated by the increased heat condition of the heating apparatus operating to cause an abnormal current to flow through the thermo element to cause the latch member to automatically open the switch contacts.

3. In a system of control for electric heating apparatus, a switch in circuit with the electric heater, comprising manual means for closing and for opening the switch contacts, a thermally controlled latch member for holding the contacts in closed position, a thermo-element controlling said latch member, and means for shunting a portion of the current around the thermo element during the normal operation of the heating apparatus and for causing an increased current to flow through said element under abnormal conditions of said apparatus to thereby release the latch and open the switch contacts.

4. A switch for controlling the circuit of an electric translating apparatus, comprising a pair of spring contact blades, a latch normally in the path of movement of one of said blades, means for moving the blades across said latch whereby one will be retained thereby, manually actuated means for releasing the latch, and an automatic latch releasing device embodying a thermal wire normally holding said latch in restrained position, said device operating to automatically push the latch outward upon the flow of a critical current through the thermal wire.

5. A switch for controlling the circuit of an electric translating apparatus, comprising a pair of spring contact blades of different lengths, a terminal contact forming a back stop for said blades, a movable latch normally in the path of the longer blade, a push button for moving the blades across said latch whereby the longer one will be retained thereby, and an automatic latch releasing device embodying a thermal wire operating to release said blade from the latch upon the flow of a predetermined current therethrough.

6. In a switch as defined in claim 5, manually actuated means for moving the latch to release the retained blade at will.

In testimony whereof I affix my signature.

MILTON H. SHOENBERG.